United States Patent
Lombardi, II

(10) Patent No.: US 7,144,506 B2
(45) Date of Patent: Dec. 5, 2006

(54) BLOW MOLDED SEPTIC TANK AND METHOD OF MANUFACTURE

(75) Inventor: Francis T. Lombardi, II, Skaneateles, NY (US)

(73) Assignee: Fralo Plastech Mfg., LLC, Syracuse, NY (US)

( * ) Notice: Subject to any disclaimer, the term of this patent is extended or adjusted under 35 U.S.C. 154(b) by 49 days.

(21) Appl. No.: 10/906,391

(22) Filed: Feb. 17, 2005

(65) Prior Publication Data

US 2005/0178721 A1    Aug. 18, 2005

Related U.S. Application Data

(60) Provisional application No. 60/545,564, filed on Feb. 18, 2004.

(51) Int. Cl.
*B01D 21/02* (2006.01)

(52) U.S. Cl. .................. 210/532.2; 210/539; 220/4.13; 220/659

(58) Field of Classification Search ............. 210/532.1, 210/532.2, 538, 539; 220/4.12, 4.13, 659
See application file for complete search history.

(56) References Cited

U.S. PATENT DOCUMENTS

| | | | | |
|---|---|---|---|---|
| 3,741,393 A | * | 6/1973 | Estes et al. ............... | 210/532.2 |
| 4,325,823 A | * | 4/1982 | Graham .................... | 210/532.2 |
| 4,961,670 A | * | 10/1990 | McKenzie et al. ....... | 210/532.2 |
| 5,342,516 A | * | 8/1994 | Rachak .................... | 210/532.2 |
| 5,361,930 A | | 11/1994 | Perry | |
| 6,227,396 B1 | * | 5/2001 | Small ........................ | 220/4.12 |
| 6,280,614 B1 | | 8/2001 | Berg et al. | |
| 6,558,535 B1 | | 5/2003 | Berg et al. | |
| 6,620,321 B1 | * | 9/2003 | Festa et al. .............. | 210/532.2 |
| 6,649,060 B1 | | 11/2003 | Perry | |
| 2002/0153380 A1 | * | 10/2002 | Wade ........................ | 220/659 |
| 2004/0011786 A1 | * | 1/2004 | Wade ........................ | 220/4.13 |

* cited by examiner

*Primary Examiner*—Christopher Upton
(74) *Attorney, Agent, or Firm*—Robert J. Sinnema; Bond, Schoeneck & King, PLLC

(57) ABSTRACT

A septic tank formed of a blow molded body having an interior and an exterior. The septic tank body is formed from one or more layers of plastic material that are chosen for their chemical, mechanical or other properties. The septic tank body includes a plurality of integral ribs to provide circumferential structurally rigidity and also includes compression molded flange portions to provide axial structural rigidity. Additionally, septic tank covers and riser systems are provided.

12 Claims, 6 Drawing Sheets

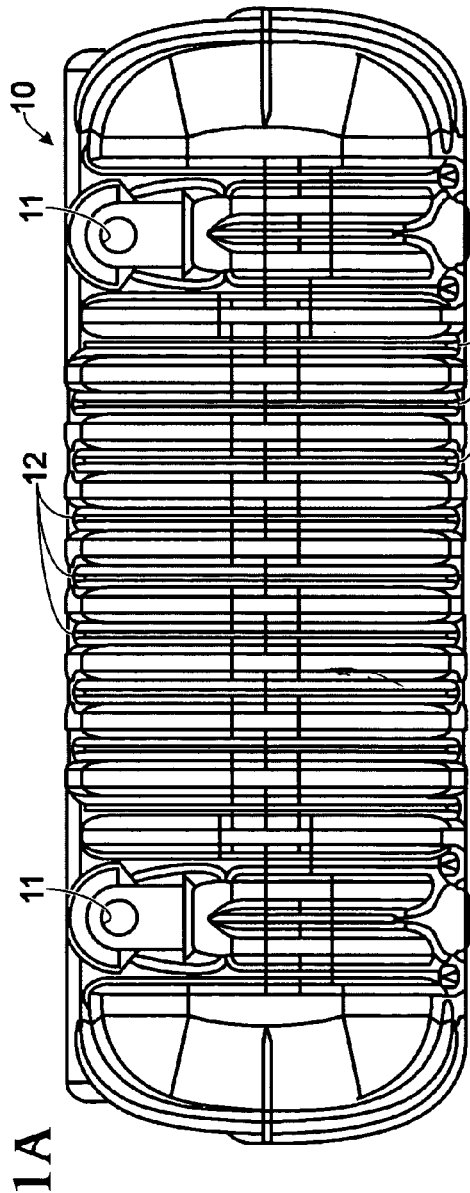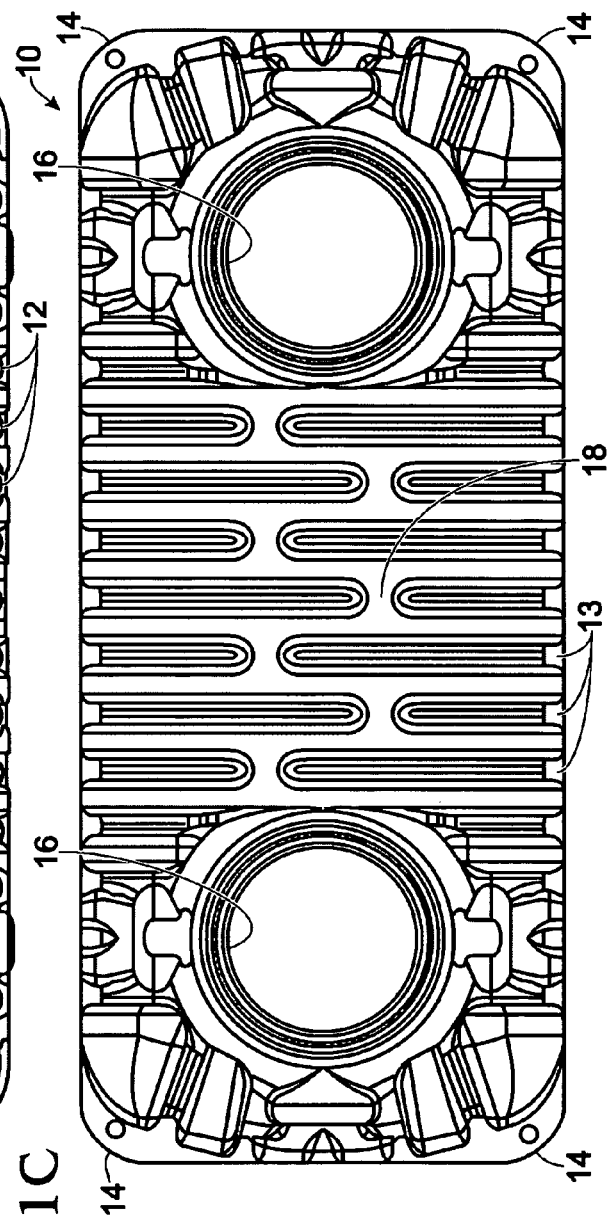
Fig. 1A
Fig. 1C

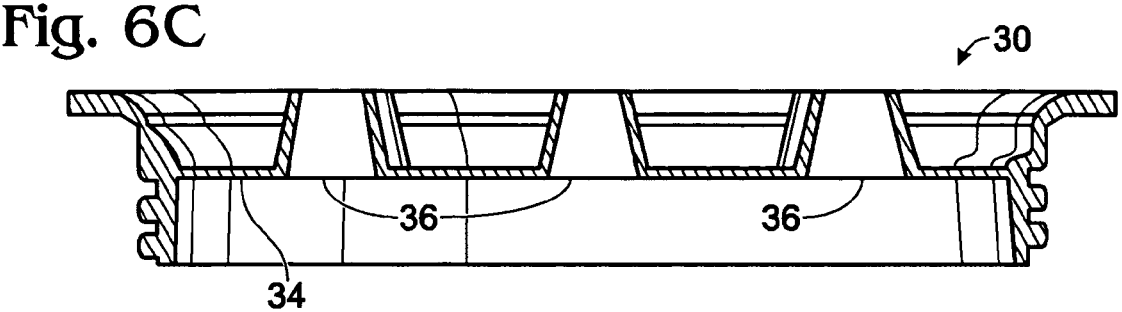
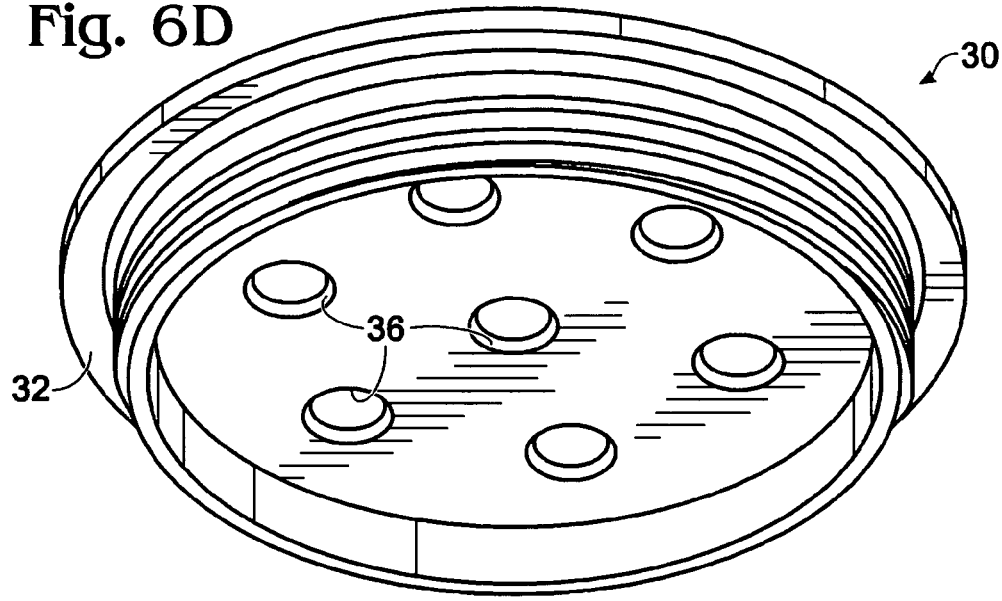
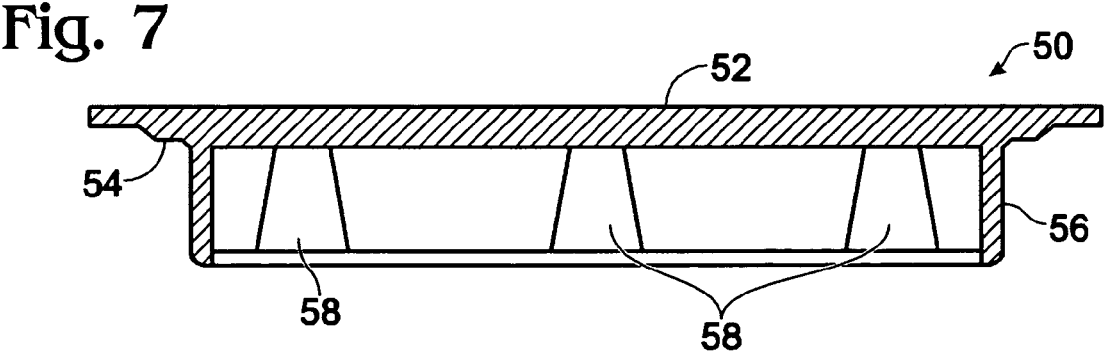

BLOW MOLDED SEPTIC TANK AND METHOD OF MANUFACTURE

FIELD OF THE INVENTION

The invention relates to the field of septic tanks and more particularly to a process of forming septic tanks that allows unique structural and performance characteristics.

BACKGROUND OF THE INVENTION

There are various types of wastewater disposal systems in use such as municipal water treatment systems. In some situations, typically in rural areas where houses are spaced so far apart that a municipal or shared sewer system would be too expensive to install, people install their own treatment systems. These systems usually employ septic tanks. A septic tank system is simply a tank that is usually buried. The tank might hold 1,000 gallons (4,000 liters) of water. Wastewater flows into the tank at one end and exits the tank at the other end, typically into a leach field. Septic tanks often include an opening on the top surface which is meant to provide access to the tank in order to facilitate cleaning and maintenance of the tank.

Septic tanks are typically constructed from concrete, steel, fiberglass or plastic. Plastic septic tanks are typically constructed using rotational molding techniques. In contrast, the present invention uses blow molding, which is a plastic manufacturing process that manufactures hollow parts that can be irregular in shape. Examples include air ducts for cars, tool cases, toys, furniture and bottles/containers.

A variety of Federal, state and local regulations impose requirements for septic tank construction. Among other things, these requirements demand a watertight and structurally sound vessel. A monolithically manufactured poly tank using previous construction methods easily meets the watertight requirement.

The problems with existing poly tanks usually manifest in the structurally sound category. A typical problem associated with existing poly tanks is collapse of the tank or deformation of vessel walls resulting from the pressure earth of the fill material surrounding the tank. Because most poly tank are manufactured using a corrugated wall profile, which typically runs circumferentially around the tank, the existing poly tanks act like an accordion when subjected to the earth's pressures, a term know in the trade as "creep".

The process of manufacturing rotationally molded tanks uses centrifugal force to spread poly resin against the mold walls which results in great variation and relatively little control in wall thickness distribution. Additionally, rotational molding is limited in its ability to manufacture parts that have significant sections with solid walls or structural stiffeners because the process cannot force poly resin into deep cavities within the mold.

The blow-molding process is a pressure process whereby poly resin is forced under pressure to seek the limits of a mold without respect to gravitational or centrifugal forces. The viscosity of the poly resin is such that this pressure can force the material into comparatively deep cavities integral to the wall structure. Hence, stiffening ribs and flanges can be integrally molded into the vessel walls to provide an increase in structural integrity.

BRIEF DESCRIPTION OF THE DRAWINGS

FIG. 1A is a side elevation view of the septic tank according to the present invention.

FIG. 1C is a top view of the septic tank according to the present invention.

FIG. 6C is a sectional side view of a cover for a septic tank according to the present invention.

FIG. 6D is a perspective view of a cover for a septic tank according to the present invention.

FIG. 7 is a side view of a cover for a septic tank according to the present invention.

DETAILED DESCRIPTION

Figure 1B:
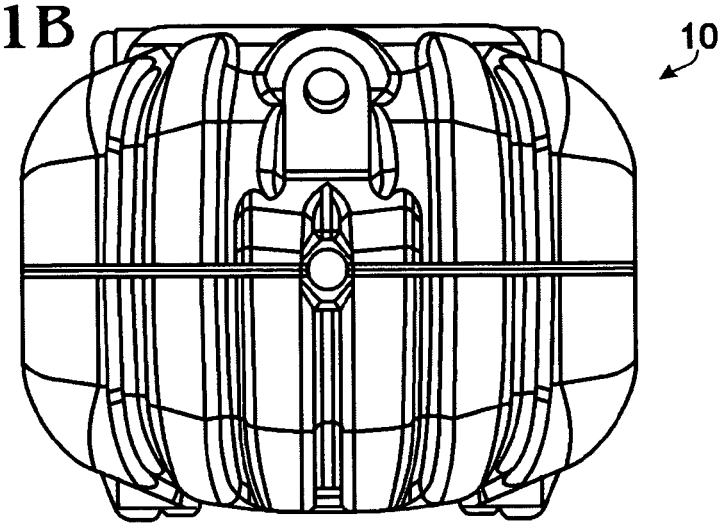
FIG. 1B is an end elevation view of the septic tank according to the present invention.

The present invention includes a septic system including a riser system that is used to provide access to the septic tank wherein the septic tank and riser system are manufactured utilizing a blow-molding technology. The utilization of blow-molding technology allows for the easy incorporation of innovative and useful features over a typical septic tank system.

The general blow molding manufacturing process is well known. The manufacturing process for the various components of the septic tank system involves the same machine components as an injection molding process for the components of septic tank systems except for two variations. The first variation includes the gathering of the plastic material in an "accumulator head" which is located directly above a mold. The mold's head is filled with plastic and before the mold closes, a hollow plastic tube, referred to as the parison, is forced out of the head and held in place while the mold closes on it. The plastic in its molten state has a consistency similar to bubble gum.

The second variation in the blow molding process versus the injection molding process lies in the clamp, or "platen," that holds the mold closed during the blow-molding process. Once the mold closes (and in some applications, as described below, before the mold completely closes), the soft parison is pierced with a needle prior to the introduction of air under pressure, typically about 100 psi air. In some cases, rather than using a piercing needle, there is a channel in the mold through which the air is introduced. With the introduction of pressurized air, the part is biased against the mold cavity and takes the shape of the mold.

Another advantage of the blow-molding process for the formation of the septic tank system is that it allows for the formation of irregular shaped parts that have a plurality of layers, because it uses a multi-layer co-extrusion process. This allows for the manufacture of a septic tank system wherein the material of each layer can be selected for it's specific performance qualities. This allows for the cost-effective construction of a watertight and corrosion resistant system. Material for each layer can be selected to provide different mechanical, chemical or aesthetic properties. The material for the exterior layer, for example, can be selected from a plastic material that confers rigid properties, such as a high molecular weight plastic. It can also include UV stabilizers and colorants for marketing purposes. Multi-layer blow molding techniques are more cost-effective than rotational molding, for example, because the use of such additives, which can be expensive, is limited to the layers in which they are necessary and most effective. Similarly, material for other layers can be selected based on its resistance to chemical activity, its food grade characteristics or for its relative cost or availability. One skilled in the art would recognize that there are numerous plastics materials that could be chosen for both the interior and exterior layers of the system.

Figure 1D:
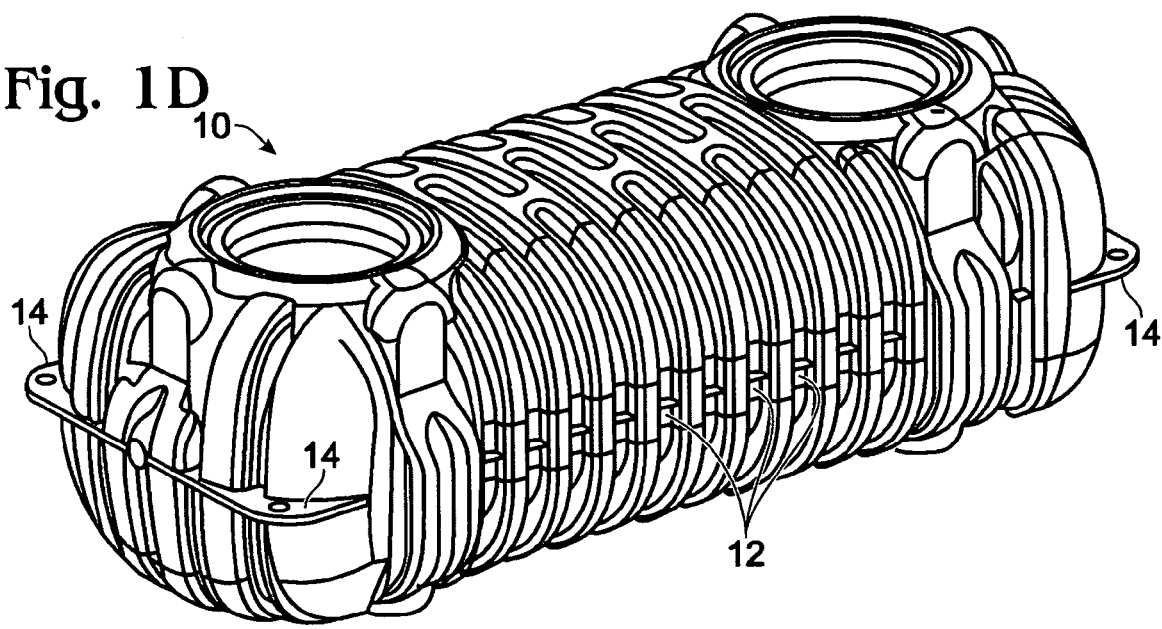
FIG. 1D is a perspective view of the septic tank according to the present invention.
Figure 2:
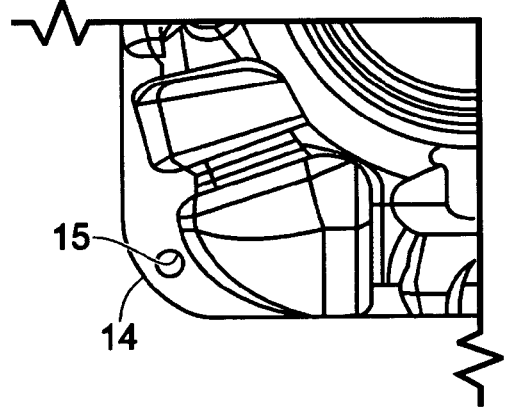
FIG. 2 is a top detail view of an anti-flotation wing of a septic tank according to the present invention.

Referring now to FIG. 1, there is shown a septic tank 10 that is formed using the blow molding technique. The tank 10 includes inlet and outlet ports 11. The ports 11 are positioned at various locations about the tank 10 in order to provide for ease on installation. The tank 10 is formed using ribs 12 to provide reinforcement to the overall structure. The tank 10 includes anti-flotation winglets 14 along the outer periphery of the tank 10. The winglets 14 help to stabilize the tank 10 when the tank 10 is buried in soil. The winglets 14 may be parallel to the soil surface or, more preferably, are inclined off of parallel in relation to the soil surface in order to provide greater stability to the tank 10. The winglets 14 may include holes 15 (FIG. 2) that can be used to provide an attachment point for securing tank 10 to an anchor (not shown) when a tank 10 is installed in conditions that require additional anti-flotation measures. During shipment of tanks 10, holes 15 provide a means of connecting a number of tanks 10 together (bundling) and also provide a means of securing tanks 10 to the shipment vehicle. The ability to bundle the tanks allows for ease of loading at the manufacturing site, ease and safety of unloading at the customer's yard with the standard forklift equipment normally found at a distributors location, and allows for use of commercially standard open deck flat or step-deck trailers (does not require specialized basket or racked trailers).

Figure 3:
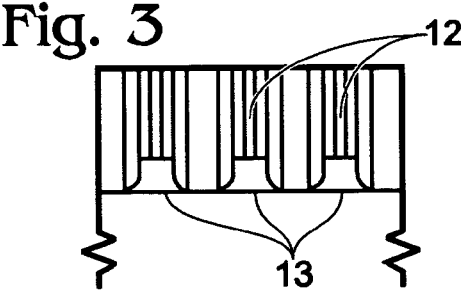
FIG. 3 is a partial sectional view of ribs and flange portions of a septic tank according to the present invention.

Referring now to FIG. 3, the tank 10 also includes flange segments 13 around the periphery of the tank 10, located between each adjacent pair of ribs 12. The flange segments 13 are in the same plane as the anti-flotation winglets 14. The flange segments 13 and winglets 14 form a continuous stiffening structure around the perimeter of the tank 10, which prevents the present invention from suffering from "creep." As described in more detail below, the flange segments 13 and winglets 14 are formed from compression molding techniques as part of the molding process of tank 10.

Figure 4A:
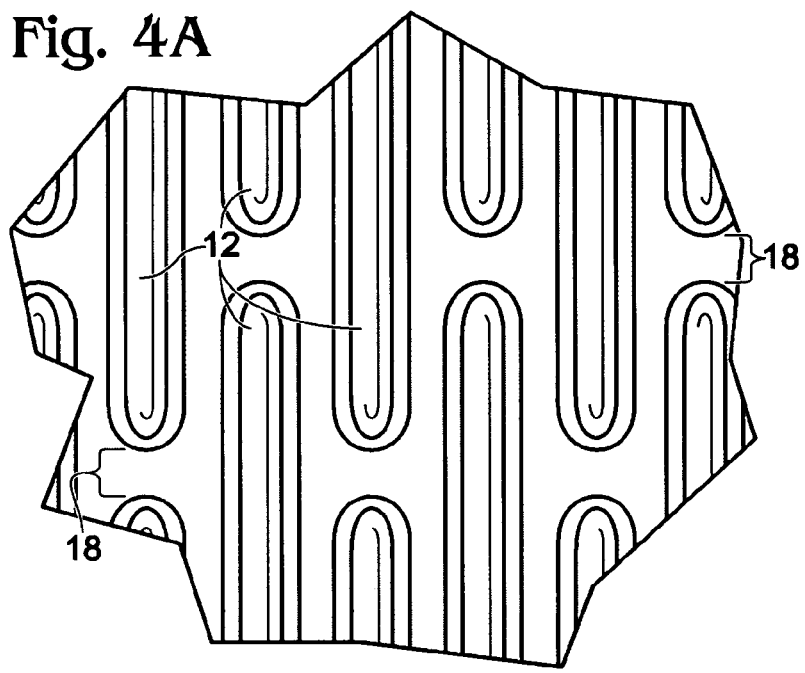
FIG. 4A is a partial top view of ribs and gaps in a septic tank according to the present invention.
Figure 4B:
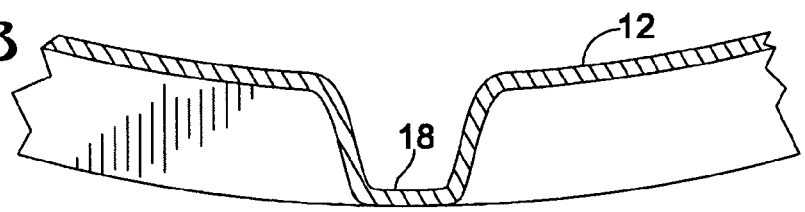
FIG. 4B is a partial sectional side view of ribs and gaps in a septic tank according to the present invention.

Referring now to FIG. 4, the bottom and top surfaces of the septic tank 10 include paths defined on the interior of the tank 10 by the terminal portions of the ribs 12. The liquid pass-through on the bottom surface of the tank 10 entails a path defined by gaps 18 formed between the interior terminal portions of the ribs 12. The liquid pass-through allows for the liquids that are present in the tank 10 to have a free flow path unobstructed by the solids or sludge layers that may form in the septic tank during use, or by the ribs 12. The tank 10 also includes a gas pass-through in the top surface of the tank 10, which is shaped in the same fashion as the liquid pass-through and similarly allow gas to pass from one end of the tank 10 to the other end in an unobstructed fashion.

The gaps 18 are formed in the full height of the ribs 12. This is possible in the present invention because the flange segments 13 and circumferential profile (described below) of the tank provide sufficient structural rigidity that it is not necessary to maintain any portion of ribs 12 through the gaps 18. It is also possible because the gaps 18 in adjacent ribs 12 are offset from each other.

The liquid pass-through and gas pass-through are serpentine because the gaps 18 in each adjacent rib 12 are offset from each other. The gaps 18 are offset to provide additional structural strength to the tank 10. A series of aligned gaps 18 would provide similar gas and liquid pass-through capability, but would create a line of structural weakness in tank 10. By offsetting the gaps 18 to form serpentine paths for liquid pass-through and gas pass-through, liquid and gas flow is permitted without substantially weakening the structural integrity of the tank 10.

Figure 5A:
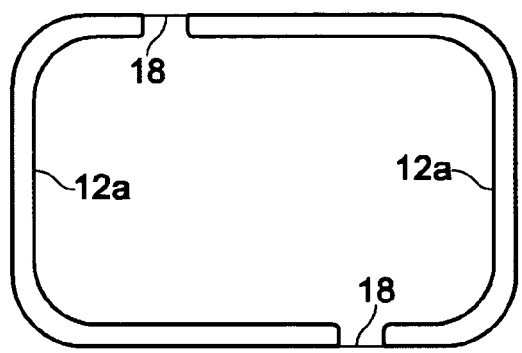
FIGS. 5A and 5B are sectional end views of ribs at different locations on a septic tank according to the present invention.
Figure 5B:
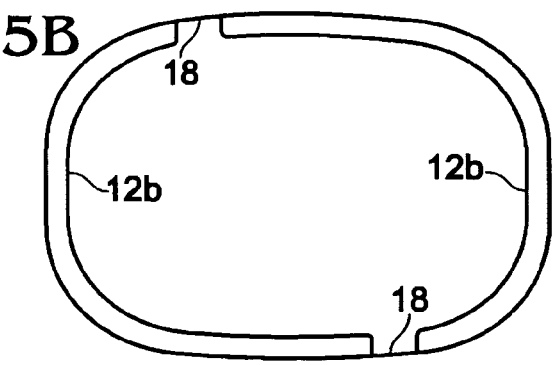

Each rib 12 is approximately 2½ to 3 inches in height. Those skilled in the art will recognize that other dimension are within the scope of this disclosure. The relative height of each rib 12 varies throughout the tank. Specifically, ribs 12 near the ends of tank 10 approximate the ovo-rectangular profile of tank 10 when viewed from either end. Approaching the mid-portion of tank 10, the ribs 12 become more circular, which enhances their structural strength. Thus tank 10 has a modified hourglass shape. FIG. 5 depicts for comparison the profile of a rib 12a that is located near one end of a tank 10 (FIG. 5A) and the profile of a rib 12b that is located near the mid point of tank 10 (FIG. 5B).

Figure 6A:
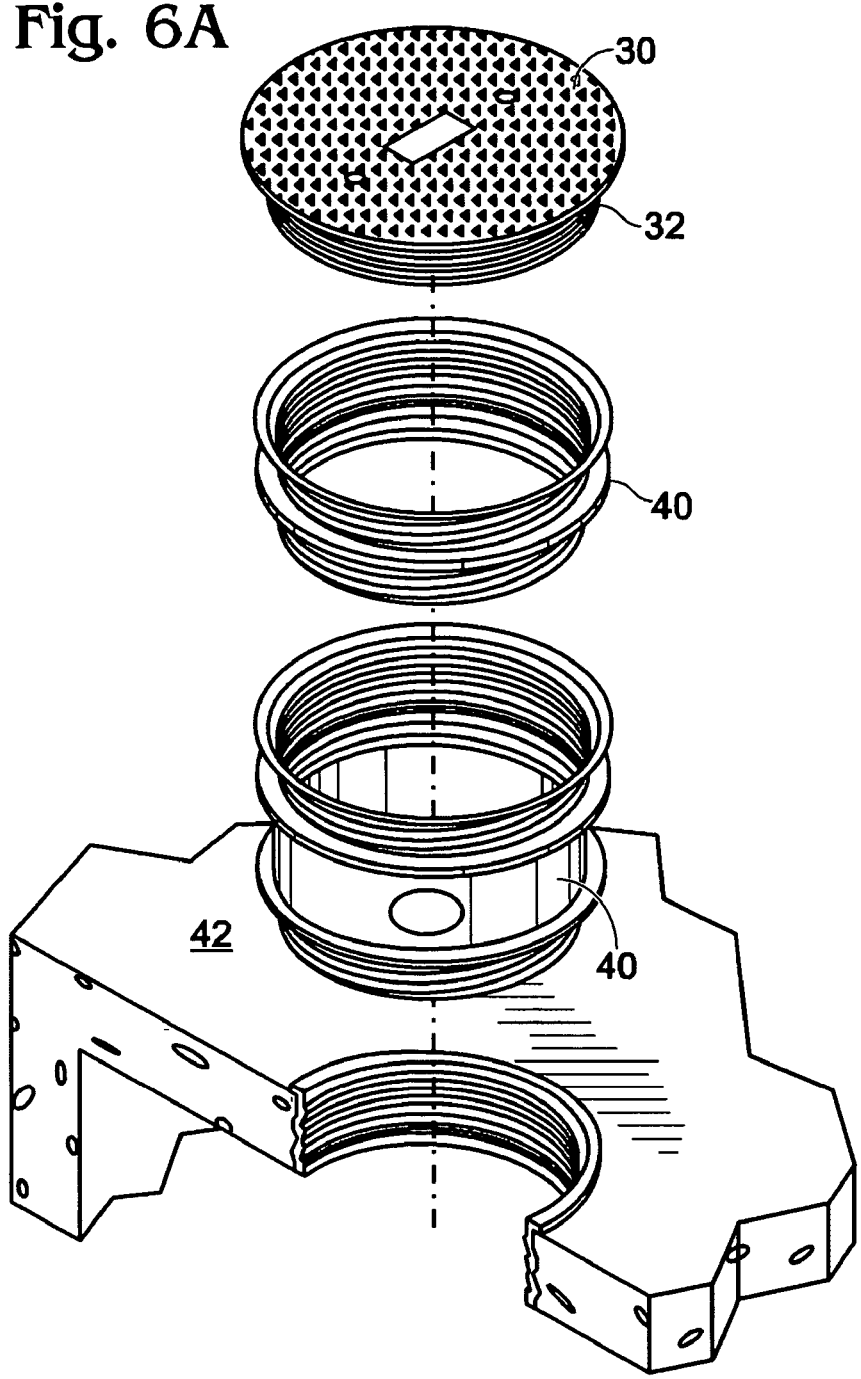
FIG. 6A is an exploded view showing components of a septic tank riser and cover system.
Figure 6B:
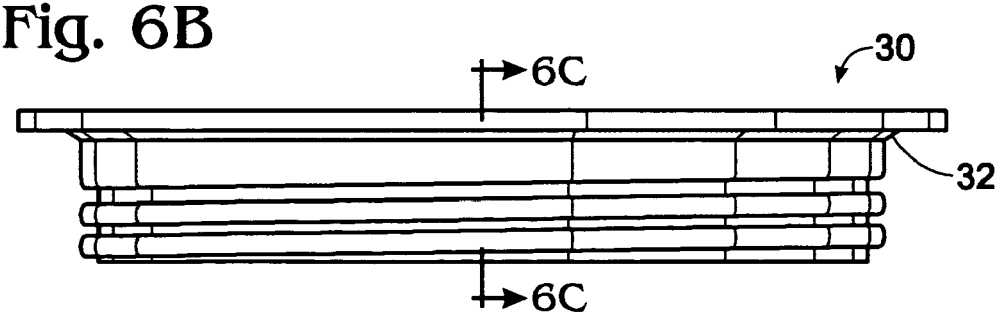
FIG. 6B is a side view of a cover for a septic tank according to the present invention.
Figure 8:
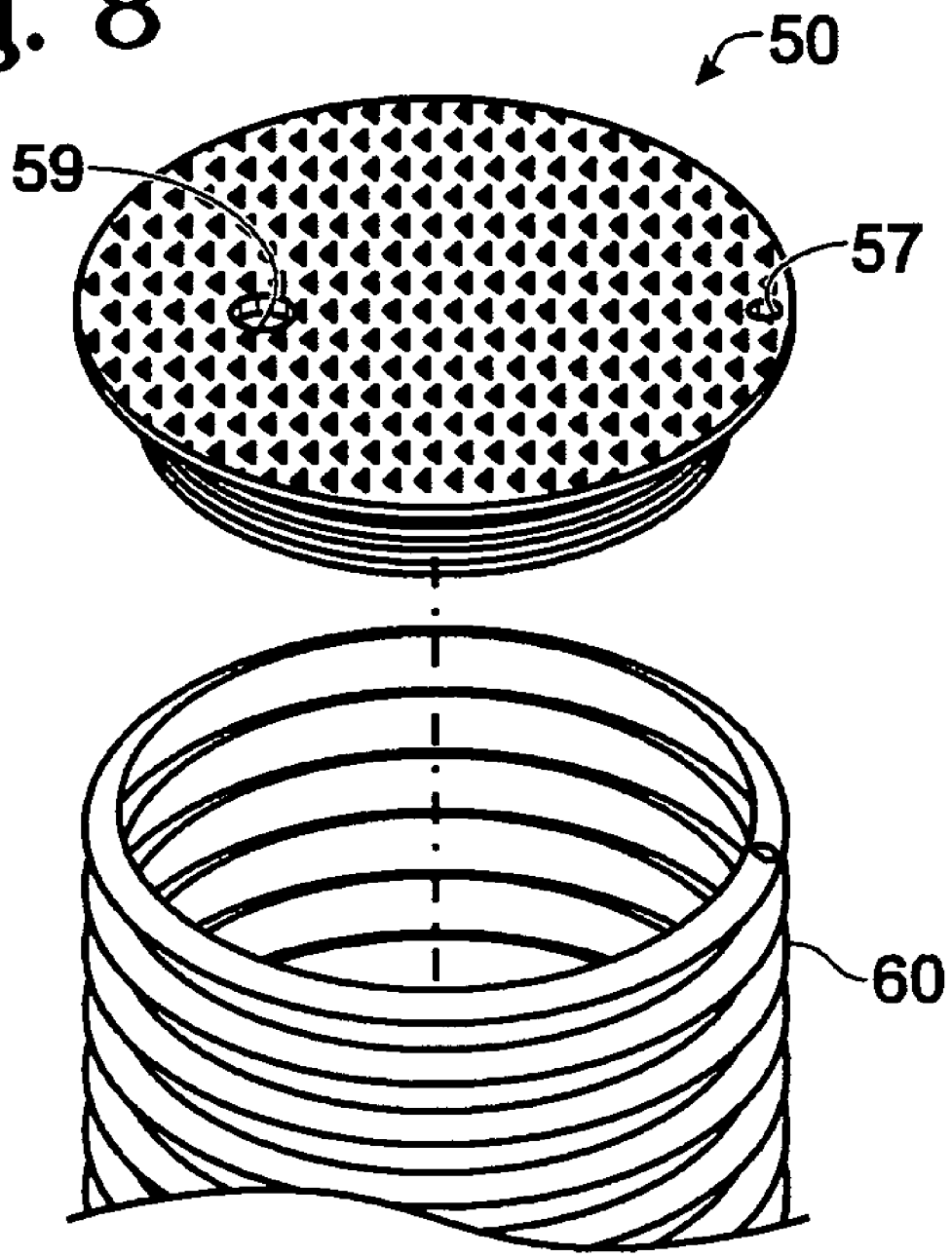
FIG. 8 is an exploded perspective view of a cover for a septic tank according to the present invention.

The tank 10 includes access openings 16 to allow access for service and maintenance. Referring to FIG. 6, the access openings 16 in the preferred embodiment include threads, which interface with either a secure cover 30 or a riser system 40. It is the blow molding process that allows for the manufacture of parts with much higher precision than in the prior art methods of septic tank system manufacturing. This higher level of precision allows for the manufacture of a threaded opening 16 in the tank 10. The threaded openings 16 can then be closed and secured with a either a cover 30 or riser system 40, both of which are manufactured with threaded connections. Covers 30 and riser systems 40 preferably are manufactured using blow molding techniques. The cover 30 is also manufactured to include a gasket 32 that is biased by the mechanism of the mutually engaged threads. The cover 30 also includes an additional advantage of the use of threaded connections in the riser system 40 is the easy retrofit of a riser system 40 into an existing concrete septic system 42. Cover 30 is hollow, and includes one or more ports 34 that communicate to the interior of the cover 30, which allows the installer to put insulation, ballast (such as sand or water), or other material into the cover 30. Cover 30 preferably is formed with standoff pillars 36 to provide additional structural rigidity.

In some instances, it is preferable to supply a cover that fits into standard size openings such as a standard 24" corrugated pipe. Typical corrugated pipe does not have a threaded connection. Referring to FIG. 3, there is shown a cover 50 that is manufactured with a very rigid flat top surface 52, a gasket 54, and a frustoconical lower section 56 that fits into the corrugated pipe 60 (FIG. 4). Because corrugated pipe is typically not manufactured to exacting specifications, the size of the opening in the pipe often varies. In the present invention, the shape of the lower section 56 allows for a slip fit into the pipe 60.

Cover 50 is manufactured using blow molding techniques, which allows for the easy incorporation of additional features into the cover 50. The cover 50 includes security features 57 that provide the ability to secure the cover 50 to the pipe 60. The cover 50 can also have ports 59 that communicate to the interior of the cover 50, which allows the installer to put ballast, such as sand or water, into the cover 50. Port 59 preferably is located on the bottom surface of cover 50, but can be located anywhere that provides communication with the interior of cover 50. The use of the security features 57 and ports 59 provide many benefits to the end user. Cover 50 preferably is formed with standoff pillars 58 to provide additional structural rigidity.

The process of manufacturing tanks 10 according to the present invention includes the steps of preparing a parison, placing the parison in a mold, pinching one end of the parison to form a "bottle", and introducing gas into the bottle to cause it to conform to the shape of the mold. Preferably, the mold for a tank 10 according to the present invention comprises two pieces, each of which includes a mating face. When the parison is placed in the mold, the two pieces are separated to allow insertion of the parison. According to the present invention, the two pieces of the mold initially are only partially closed. That is, a gap sufficient to allow the parison to pass partially between the mating faces of the mold pieces is maintained initially between the mating faces of the pieces of the mold after one end of the parison has been pinched to form a bottle. At this point gas, preferably atmospheric air, is introduced into the bottle, causing it to expand. The natural expansion of the bottle causes it to force molten plastic material into the gap between the mating faces of the two pieces of the mold. At this point the pieces of the mold are closed together to compress the molten plastic between the mating faces of the mold pieces. This compression molds the portion of the bottle that is between the mating faces of the mold pieces. The flange portions 13 and winglets 14 according to the present invention are formed by this compression molding step. In this way, the present invention provides flange portions 13 and winglets 14 that have substantially more structural strength than can be achieved using rotational molding techniques. As gas is injected into the balloon, the portions of the balloon that are not compressed between the mold pieces thin slightly and consistently relative to the portion of the bottle in the area of the mold pieces mating faces. The wall thickness of tanks 10 thus varies in a consistent fashion so that the wall thickness in the area of the flange portions 13 is approximately 2–3 times the average wall thickness of the tank 10. This provides additional structural rigidity to prevent installed tanks 10 from experiencing creep.

What is claimed is:

1. A blow-molded septic tank having an interior, an exterior, an upper surface, a lower surface, and two ends, said tank comprising:

a plurality of integral, circumferential ribs formed in the tank's upper surface and lower surface, each rib depressed into the interior of the tank, wherein each of said ribs incompletely encircles the tank to form an upper gap and a lower gap in each rib;

wherein the upper gap of each rib is circumferentially offset relative to the upper gap of each adjacent rib, such that said upper gaps form a serpentine gas pass-through channel in the upper surface of the tank;

wherein the lower gap of each rib is circumferentially offset relative to the lower gap of each adjacent rib, such that said lower gaps form a serpentine liquid pass-through channel in the lower surface of the tank;

flange portions on the exterior surface, formed in the depression of each rib; and at least one service opening to the interior of the tank.

2. A septic tank according to [claim 1], wherein said flange portions lie in a plane that bisects the tank approximately between the upper surface and the lower surface.

3. A septic tank according to [claim 2] wherein the flange portions are formed by compression molding.

4. A septic tank according to [claim 2] further comprising anti-flotation wings.

5. A septic tank according to [claim 4] wherein said anti-flotation wings are in the same plane as the flange portions.

6. A septic tank according to [claim 1] wherein the depth that each rib is depressed into the tank's interior increases with said rib's distance from said ends and reaches a maximum at the midpoint between said ends.

7. A septic tank according to [claim 6] wherein for ribs proximate the ends, the shape of the depression formed by said ribs in the surface of the tank is approximately ovo-rectangular and wherein the for ribs proximate the midpoint between the ends, the shape of the depression formed by said ribs in the surface of the tank is approximately circular.

8. A septic tank according to [claim 1] further comprising a cover.

9. A septic tank according to [claim 1] wherein said at least one service opening comprises first threads.

10. A septic tank according to [claim 9] further comprising a cover, said cover comprising second threads for engaging said first threads.

11. A septic tank according to [claim 10], wherein said cover further comprises a gasket for forming a seal when said first threads and said second threads are engaged.

12. A septic tank according to [claim 9] further comprising a riser assembly, said riser assembly comprising:

second threads for engaging said tank's first threads; and a cover for closing said riser.

* * * * *